(12) United States Patent
Matsuo et al.

(10) Patent No.: US 9,108,622 B2
(45) Date of Patent: Aug. 18, 2015

(54) DRIVE CONTROL APPARATUS FOR VEHICLE AND METHOD OF CONTROLLING DRIVE APPARATUS FOR VEHICLE

(75) Inventors: Noriko Matsuo, Anjo (JP); Yuichiro Kitamura, Nagoya (JP); Yuji Kinutani, Nara-ken (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 587 days.

(21) Appl. No.: 13/559,358

(22) Filed: Jul. 26, 2012

(65) Prior Publication Data

US 2013/0029805 A1    Jan. 31, 2013

(30) Foreign Application Priority Data

Jul. 27, 2011 (JP) ................................. 2011-163870

(51) Int. Cl.
*B60W 10/06* (2006.01)
*B60K 6/46* (2007.10)
*B60W 10/02* (2006.01)
*B60W 20/00* (2006.01)
*B60K 6/48* (2007.10)

(52) U.S. Cl.
CPC .................. *B60W 10/06* (2013.01); *B60K 6/46* (2013.01); *B60W 10/02* (2013.01); *B60W 20/40* (2013.01); *B60K 6/48* (2013.01); *B60K 2006/4825* (2013.01); *B60W 2510/081* (2013.01); *B60W 2540/10* (2013.01); *B60W 2710/0644* (2013.01); *Y02T 10/6217* (2013.01); *Y02T 10/6221* (2013.01); *Y02T 10/6252* (2013.01); *Y10T 477/26* (2015.01)

(58) Field of Classification Search
None
See application file for complete search history.

(56) References Cited

U.S. PATENT DOCUMENTS

2006/0089232 A1* 4/2006 Kobayashi et al. ............. 477/70
2010/0256850 A1 10/2010 Sakata

FOREIGN PATENT DOCUMENTS

JP    2008-055993 A    3/2008

* cited by examiner

*Primary Examiner* — Erin D Bishop
(74) *Attorney, Agent, or Firm* — Buchanan Ingersoll & Rooney PC

(57) ABSTRACT

A drive control apparatus for a vehicle includes an engine, an electric motor, a clutch mechanism, an engine rotation sensor, a motor rotation sensor, an acceleration and deceleration intention detecting portion, and a controller. The controller controls a rotation speed of the engine to be an acceleration intention target value greater than a rotation speed of the motor and thereafter brings the clutch mechanism into the engagement state in a case where the acceleration and deceleration intention detecting portion detects that the vehicle is in an acceleration intention mode, and controls the rotation speed of the engine to be a deceleration intention target value smaller than the rotation speed of the motor and thereafter brings the clutch mechanism into the engagement state in a case where the acceleration and deceleration intention detecting portion detects that the vehicle is in a deceleration intention mode.

6 Claims, 9 Drawing Sheets

DRIVE CONTROL APPARATUS FOR VEHICLE AND METHOD OF CONTROLLING DRIVE APPARATUS FOR VEHICLE

CROSS REFERENCE TO RELATED APPLICATIONS

This application is based on and claims priority under 35 U.S.C. §119 to Japanese Patent Application 2011-163870, filed on Jul. 27, 2011, the entire content of which is incorporated herein by reference.

TECHNICAL FIELD

This disclosure generally relates to a drive control apparatus for a vehicle and a method of controlling a drive apparatus for a vehicle.

BACKGROUND DISCUSSION

A known drive control apparatus for a hybrid vehicle where wheels are driven by an engine and an electric motor is disclosed in JP2008-55993A (which will be hereinafter referred to as Reference 1), for example. In the hybrid vehicle (the vehicle) disclosed in Reference 1, the engine, the electric motor, and a transmission are connected to one another in series so that the vehicle is driven by a combination of the engine and the electric motor. According to the drive control apparatus disclosed in Reference 1, in a case where the vehicle is started from a stopped state, the wheels are driven by the electric motor. In a case of accelerating the vehicle during a driving state of the vehicle, a clutch mechanism disposed between the engine and the electric motor is brought into an engagement state, i.e., the engine and the electric motor are connected to each other via the clutch mechanism, so that the driving of the wheels by the electric motor is assisted by the engine.

In addition, in a case of decelerating the vehicle by a brake operation during the driving state, a regenerative brake is initially obtained. Then, in a case where a further braking force is required, the clutch mechanism is brought into the engagement state to thereby obtain an engine brake. According to the drive control apparatus disclosed in Reference 1, the clutch mechanism is operated depending on the situation so as to connect or disconnect between the engine and the electric motor.

In a case where the clutch mechanism is operated so as to connect between the engine and the electric motor, an impact may occur at the vehicle depending on a rotation speed of each of the engine and the electric motor. For example, when the engine, of which the rotation speed is lower than that of the electric motor, is connected to the electric motor in a state where the wheels are driven only by the electric motor, a driver of the vehicle may feel like the vehicle is pulled rearward because of a rapid deceleration of the vehicle. At this time, according to the drive control apparatus disclosed in Reference 1, the clutch mechanism is brought into the engagement state when an absolute difference between the rotation speed of the electric motor and the rotation speed of the engine becomes equal to or smaller than a predetermined value. Therefore, the impact that occurs at the vehicle when the clutch mechanism is brought into the engagement state is reduced to some extent.

Nevertheless, according to Reference 1, the clutch mechanism is brought into the engagement state only on a basis of the absolute difference between the rotation speed of the electric motor and the rotation speed of the engine. Thus, the behavior of the vehicle that occurs due to the engagement of the clutch mechanism may differ from the intention of the vehicle driver at that time. That is, the vehicle driver may have from a large discomfort by feeling that the vehicle is pulled rearward because the engine having the lower rotation speed than that of the electric motor is connected to the electric motor in a case where the clutch mechanism is operated so as to accelerate the vehicle during the driving state.

On the other hand, the vehicle driver may also have the same discomfort by feeling that the vehicle is pushed forward because the engine at a high rotation state is connected to the electric motor in a case where the clutch mechanism is operated so as to decelerate the vehicle.

A need thus exists for a drive control apparatus for a vehicle and a method of controlling a drive apparatus for a vehicle which are not susceptible to the drawback mentioned above.

SUMMARY

According to an aspect of this disclosure, a drive control apparatus for a vehicle includes an engine driving wheels, an electric motor arranged between the engine and the wheels in series, a clutch mechanism arranged between the engine and the electric motor and brought into an engagement state to connect the engine and the electric motor to each other and into a disengagement state to disconnect the engine and the electric motor from each other, an engine rotation sensor detecting a rotation speed of the engine, a motor rotation sensor detecting a rotation speed of the electric motor, an acceleration and deceleration intention detecting portion detecting whether a vehicle is in an acceleration intention mode or a deceleration intention mode, and a controller controlling an operation of the clutch mechanism so that the vehicle is driven by one of or both of the engine and the electric motor based on a detection value of each of the engine rotation sensor, the motor rotation sensor, and the acceleration and deceleration intention detecting portion. In a case of operating the clutch mechanism from the disengagement state to the engagement state, the controller controls the rotation speed of the engine to be an acceleration intention target value greater than the rotation speed of the motor and thereafter brings the clutch mechanism into the engagement state in a case where the acceleration and deceleration intention detecting portion detects that the vehicle is in the acceleration intention mode, and controls the rotation speed of the engine to be a deceleration intention target value smaller than the rotation speed of the motor and thereafter brings the clutch mechanism into the engagement state in a case where the acceleration and deceleration intention detecting portion detects that the vehicle is in the deceleration intention mode.

According to another aspect of this disclosure, a method of controlling a drive apparatus for a vehicle, the drive apparatus including an engine driving wheels, an electric motor arranged between the engine and the wheels in series, a clutch mechanism arranged between the engine and the electric motor and brought into an engagement state to connect the engine and the electric motor to each other and into a disengagement state to disconnect the engine and the electric motor from each other, an engine rotation sensor detecting a rotation speed of the engine, and a motor rotation sensor detecting a rotation speed of the electric motor, the method includes controlling the rotation speed of the engine to be an acceleration intention target value greater than the rotation speed of the motor and thereafter bringing the clutch mechanism into the engagement state when the vehicle is in the acceleration intention mode in a case of operating the clutch mechanism from the disengagement state to the engagement state, and controlling the rotation speed of the engine to be a deceleration intention target value smaller than the rotation speed of the motor and thereafter bringing the clutch mechanism into the engagement state when the vehicle is in the deceleration intention mode in the case of operating the clutch mechanism from the disengagement state to the engagement state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
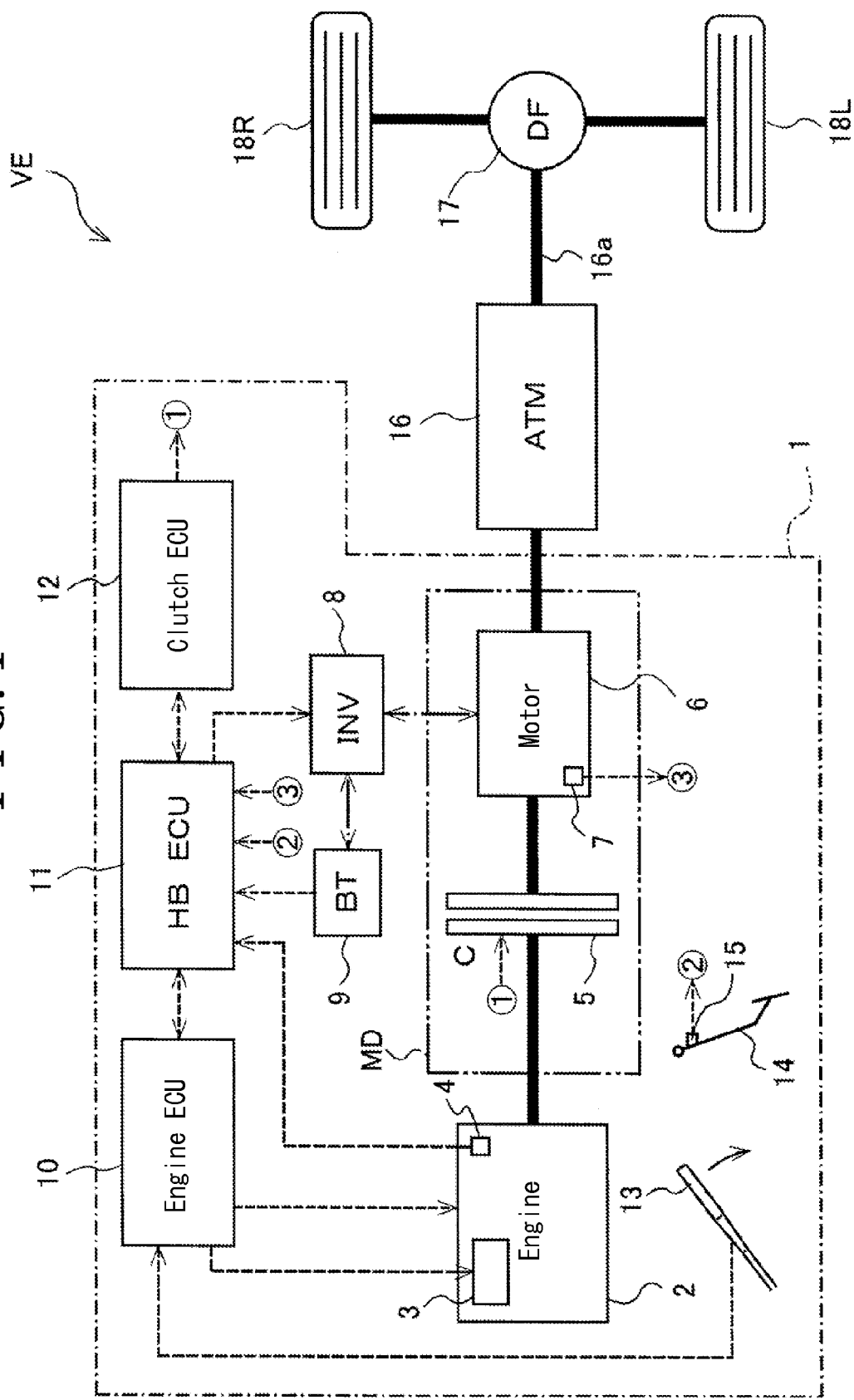
FIG. 1 is a drive system diagram including a drive control apparatus for a vehicle according to an embodiment disclosed here.

A drive control apparatus 1 for a vehicle according to an embodiment and a control method thereof will be explained with reference to FIGS. 1 to 9. FIG. 1 schematically illustrates a drive system of a hybrid vehicle VE (hereinafter simply referred to as a vehicle VE) including an engine 2 and an electric motor 6. In FIG. 1, each thick line indicates a mechanical connection between devices. Each dashed line arrow indicates a control signal line while each alternate long and short dash line arrow indicates an electric power supply line of the vehicle VE.

The engine 2 of the vehicle VE is a normal internal combustion engine generating an output by a hydrocarbon fuel. The engine 2 includes an exhaust brake device 3 that applies a braking force to the vehicle VE by partially closing an exhaust pipe by means of a valve. An engine rotation sensor 4 is attached to the engine 2 so as to detect a rotation speed of the engine 2.

The electric motor 6 is arranged in series between the engine 2, and driving wheels 18R and 18L (a right driving wheel 18R and a left driving wheel 18L) serving as wheels. The electric motor 6 is a synchronous motor for driving wheels according to the embodiment, however, is not limited thereto. A motor rotation sensor 7 is attached to the electric motor 6 so as to detect a rotation speed of the electric motor 6. A transmission 16 is connected in series to the electric motor 6. The transmission 16 is a normal automatic transmission including a torque converter. The right driving wheel 18R and the left driving wheel 18L of the vehicle VE are connected to an output shaft 16a of the transmission 16 via a differential device 17. Hereinafter, the right driving wheel 18R and the left driving wheel 18L will be collectively referred to as the driving wheels 18R and 18L.

A clutch device 5 serving as a clutch mechanism is arranged between the engine 2 and a rotor of the electric motor 6. The clutch device 5 is a wet multi-plate clutch. A hydraulic pump is connected to the clutch device 5 via a control valve. A hydraulic pressure generated by the hydraulic pump is applied to the clutch device 5 or the hydraulic pressure applied to the clutch device 5 is released therefrom to thereby obtain or block a torque transmission between the engine 2 and the electric motor 6. According to the clutch device 5 of the present embodiment, the clutch device 5 is normally inhibited from receiving the hydraulic pressure so that the engine 2 and the electric motor 6 are connected to each other (i.e., the clutch device 5 is a normally closed clutch device). A configuration and an operation method of the clutch device 5 are known and are disclosed in JP2009-202713A or JP2009-6735A, for example.

A vehicle battery 9 is connected to a stator of the electric motor 6 via an inverter 8. An electric power of the vehicle battery 9 is converted to a three-phase alternating current by the inverter 8 and is then supplied to the stator of the electric motor 6 to thereby drive the rotor of the electric motor 6. An electric power generated by the electric motor 6 is charged to the vehicle battery 9 via the inverter 8. According to the present embodiment, the clutch device 5 and the electric motor 6 constitute a front module MD. In addition, the engine 2, the clutch device 5, the electric motor 6, the engine rotation sensor 4, and the motor rotation sensor 7 constitute a drive apparatus for a vehicle.

An engine ECU 10 is connected to a fuel injection device of the engine 2. The engine 2 is connected to a hybrid ECU 11 so that the rotation speed of the engine 2 is controlled on a basis of an engine control signal from the hybrid ECU 11. An exhaust brake switch 13 provided at a driver's seat of the vehicle VE is connected to the engine ECU 10 so as to operate the exhaust brake device 3 when a driver of the vehicle VE operates the exhaust brake switch 13.

An acceleration opening sensor 15 provided at an acceleration pedal 14, the engine rotation sensor 4, the motor rotation sensor 7, and the inverter 8 are connected to the hybrid ECU 11. Each of the acceleration opening sensor 15 and the engine rotation sensor 4 serves as an acceleration and deceleration intention detecting portion. The hybrid ECU 11 controls the rotation speed of the engine 2 via the engine ECU 10 based on a detection value of the acceleration opening sensor 15. The hybrid ECU 11 also controls the rotation speed of the electric motor 6 via the inverter 8 based on the detection value of the acceleration opening sensor 15, a shift position switch of the transmission 16, and a detection signal of a vehicle speed sensor, for example.

A clutch ECU 12 is connected to the hybrid ECU 11. The control valve and the hydraulic pump of the clutch device 5 are electrically connected to the clutch ECU 12 so that the operations of the control valve and the hydraulic pump are controlled on a basis of a clutch operation signal from the hybrid ECU 11. The vehicle battery 9 is further electrically connected to the hybrid ECU 11 so that the electric motor 6 is appropriately operated as a generator based on a charging state of the vehicle battery 9. The engine ECU 10, the hybrid ECU 11, and the clutch ECU 12 collectively serve as a controller.

The hybrid ECU 11 operates the clutch device 5 based on a driving state of the vehicle VE and selectively controls the driving wheels 18R and 18L to be driven by only the electric motor 6, by only the engine 2, or by both the engine 2 and the electric motor 6, via the transmission 16.

A normal driving method of the vehicle VE illustrated in FIG. 1 will be briefly explained below. When the vehicle VE is started, the clutch device 5 is brought into a disengagement state so that the driving wheels 18R and 18L are driven to rotate mainly by the electric motor 6 via the transmission 16. In a case where the vehicle VE is accelerated during the driving state thereof, the clutch device 5 is brought into an engagement state so that the driving wheels 18R and 18L are driven to rotate by the engine 2 in addition to the electric motor 6. That is, the vehicle VE is driven by a driving force of the engine 2 in addition to the electric motor 6 (i.e., restart of the vehicle VE). In a case where a brake operation of the vehicle VE is conducted, a regenerative braking is performed in a state where the clutch device 5 is in the disengagement state. In a case of increasing the braking force of the vehicle VE, the clutch device 5 is brought into the engagement state so that an engine brake becomes effective. The electric motor 6 is driven by the engine 2 via the clutch device 5 so as to also function as a generator.

Next, a method of controlling the rotation speed of the engine 2 by the engine ECU 10 and the hybrid ECU 11 in a case where the clutch device 5 is operated from the disengagement state to the engagement state will be explained with reference to FIGS. 2 to 7. In the method of controlling the rotation speed of the engine 2 illustrated in FIGS. 2 to 7, the hybrid ECU 11 detects an acceleration and deceleration intention (an acceleration/deceleration intention) of the vehicle VE (i.e., whether the vehicle is in an acceleration intention mode or in a deceleration intention mode) based on a request torque T relative to the engine 2 by the driver of the vehicle VE. The request torque T is calculated on a basis of a rotation speed Ne of the engine 2 detected by the engine rotation sensor 4 in a state where an acceleration opening θ (%) detected by the acceleration opening sensor 15 serves as a parameter.

Figure 2:
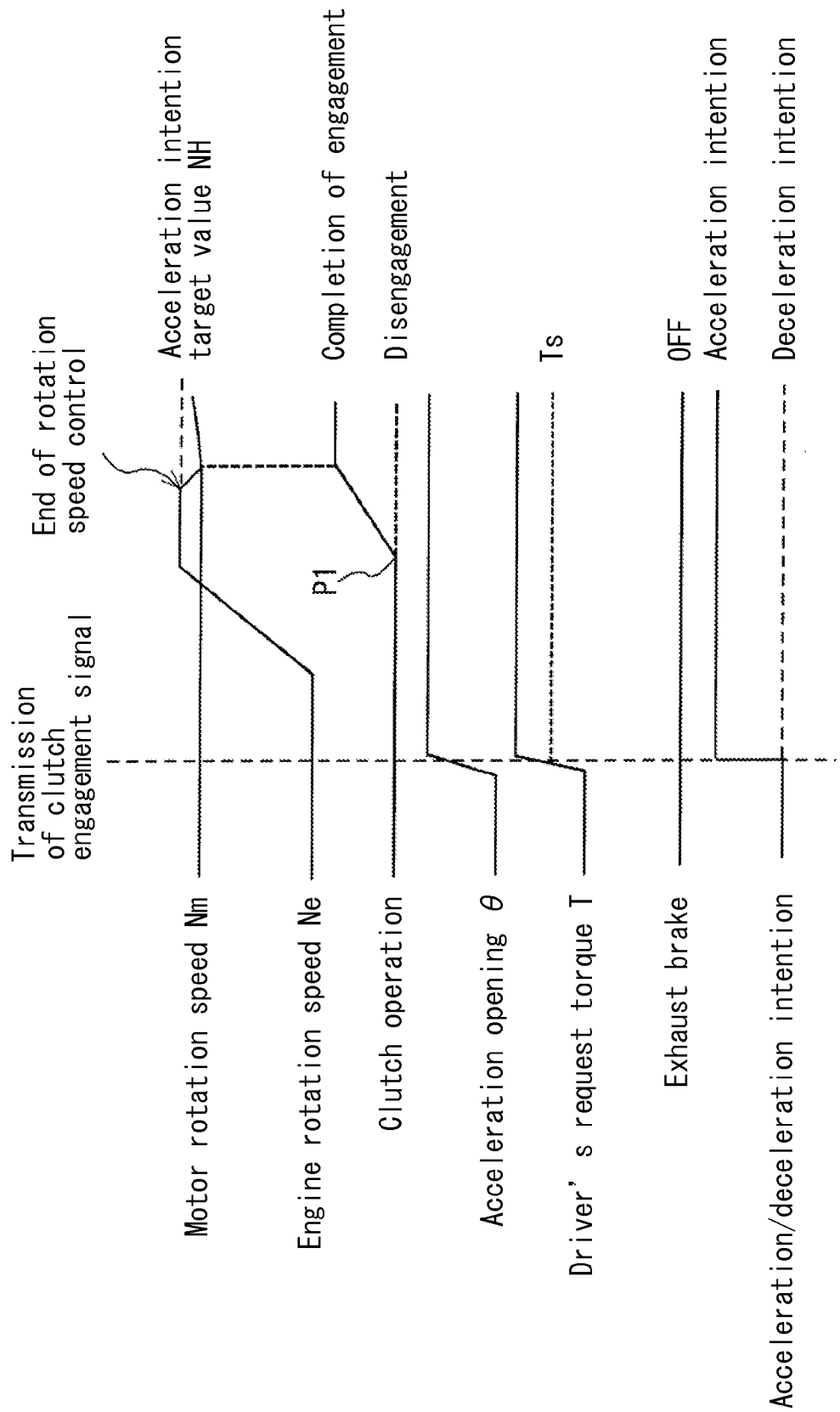
FIG. 2 is a time chart illustrating a control method by the drive control apparatus illustrated in FIG. 1 in a case where a vehicle is in an acceleration intention mode.

As illustrated in FIG. 2, when the driver of the vehicle VE operates the acceleration pedal 14 so that the acceleration opening θ turns to be a predetermined amount (the restart of the vehicle VE) in a state where the clutch device 5 is in the disengagement state and the vehicle VE is driven only by the electric motor 6, the hybrid ECU 11 transmits a clutch engagement signal to the clutch ECU 12. At this time, however, the engagement operation of the clutch device 5 is not started.

When the clutch engagement signal is transmitted by the hybrid ECU 11, the acceleration and deceleration intention of the vehicle VE is detected on a basis of the request torque T relative to the engine 2 by the driver calculated on a basis of the acceleration opening θ and the rotation speed Ne of the engine 2. As illustrated in FIG. 2, at a time when the clutch engagement signal is transmitted, the request torque T is equal to or greater than an intention determination threshold value Ts so that the hybrid ECU 11 determines that the driver of the vehicle VE desires or intends to accelerate the vehicle VE and the vehicle VE is in the acceleration intention mode.

In a case where it is detected that the vehicle VE is in the acceleration intention mode, the hybrid ECU 11 specifies an acceleration intention target value NH as a target value of the rotation speed Ne of the engine 2. The acceleration intention target value NH is specified to be larger by a predetermined value than a value of a rotation speed Nm of the electric motor 6 obtained when the vehicle VE is determined to be in the acceleration intention mode. Afterwards, the hybrid ECU 11 transmits the engine control signal to the engine ECU 10 so as to increase the rotation speed Ne of the engine 2 to the acceleration intention target value NH. When the rotation speed Ne reaches the acceleration intention target value NH and therefore an unintended impact on the driver may be inhibited from occurring at the vehicle VE, the hybrid ECU 11 transmits the clutch operation signal to the clutch ECU 12 so as to start the engagement operation of the clutch device 5. In FIG. 2, the engagement start where the engagement operation of the clutch device 5 is started is indicated by P1.

Afterwards, when a state where the rotation speed Ne of the engine 2 is equal to the acceleration intention target value NH is continued for a predetermined time period, the hybrid ECU 11 terminates a rotation speed control of the engine 2. Because of the engagement of the clutch device 5, the rotation speed Ne of the engine 2 follows the rotation speed Nm of the electric motor 6. The engagement operation of the clutch device 5 is completed in a state where the rotation speed Ne of the engine 2 is equal to the rotation speed Nm of the electric motor 6.

Figure 3:
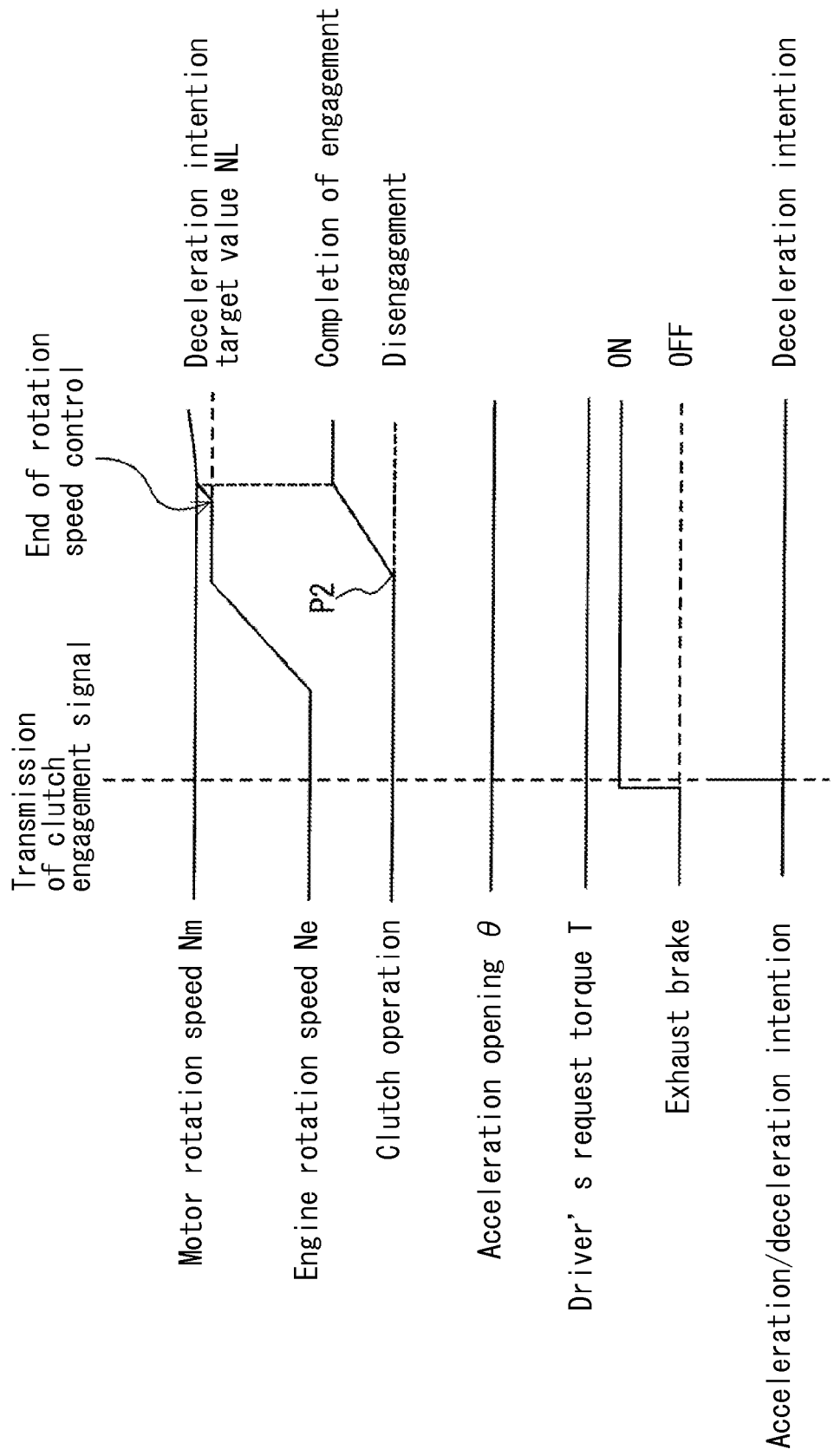
FIG. 3 is a time chart illustrating the control method by the drive control apparatus illustrated in FIG. 1 in a case where the vehicle is in a deceleration intention mode.

As illustrated in FIG. 3, when the driver of the vehicle VE operates the exhaust brake switch 13 and then the exhaust brake device 3 is operated in a state where the clutch device 5 is in the disengagement state and the vehicle VE is driven only by the electric motor 6, the hybrid ECU 11 transmits the clutch engagement signal so as to obtain the engine brake. At this time, however, the engagement operation of the clutch device 5 is not started.

Because the request torque T relative to the engine 2 at a time when the clutch disengagement signal is transmitted by the operation of the exhaust brake switch 13 is smaller than the intention determination threshold value Ts, the hybrid ECU 11 determines that the driver of the vehicle VE desires or intends to decelerate the vehicle VE and the vehicle VE is in the deceleration intention mode. In a case where it is detected that the vehicle VE is in the deceleration intention mode, the hybrid ECU 11 specifies a deceleration intention target value NL as the target value of the rotation speed Ne of the engine 2. The deceleration intention target value NL is specified to be smaller by a predetermined value than the value of the rotation speed Nm of the electric motor 6 obtained when the vehicle VE is determined to be in the deceleration intention mode.

Afterwards, the hybrid ECU 11 transmits the engine control signal to the engine ECU 10 so as to increase the rotation speed Ne of the engine 2 to the deceleration intention target value NL. When the rotation speed Ne reaches the deceleration intention target value NL and thus the unintended impact on the driver may be inhibited from occurring at the vehicle VE, the hybrid ECU 11 transmits the clutch operation signal to the clutch ECU 12 so as to start the engagement operation of the clutch device 5. In FIG. 3, the engagement start where the engagement operation of the clutch device 5 is started is indicated by P2.

Thereafter, when a state where the rotation speed Ne of the engine 2 is equal to the deceleration intention target value NL is continued for the predetermined time period, the hybrid ECU 11 terminates the rotation speed control of the engine 2. Because of the engagement of the clutch device 5, the rotation speed Ne of the engine 2 follows the rotation speed Nm of the electric motor 6. The engagement operation of the clutch device 5 is completed in a state where the rotation speed Ne of the engine 2 is equal to the rotation speed Nm of the electric motor 16.

Figure 4:
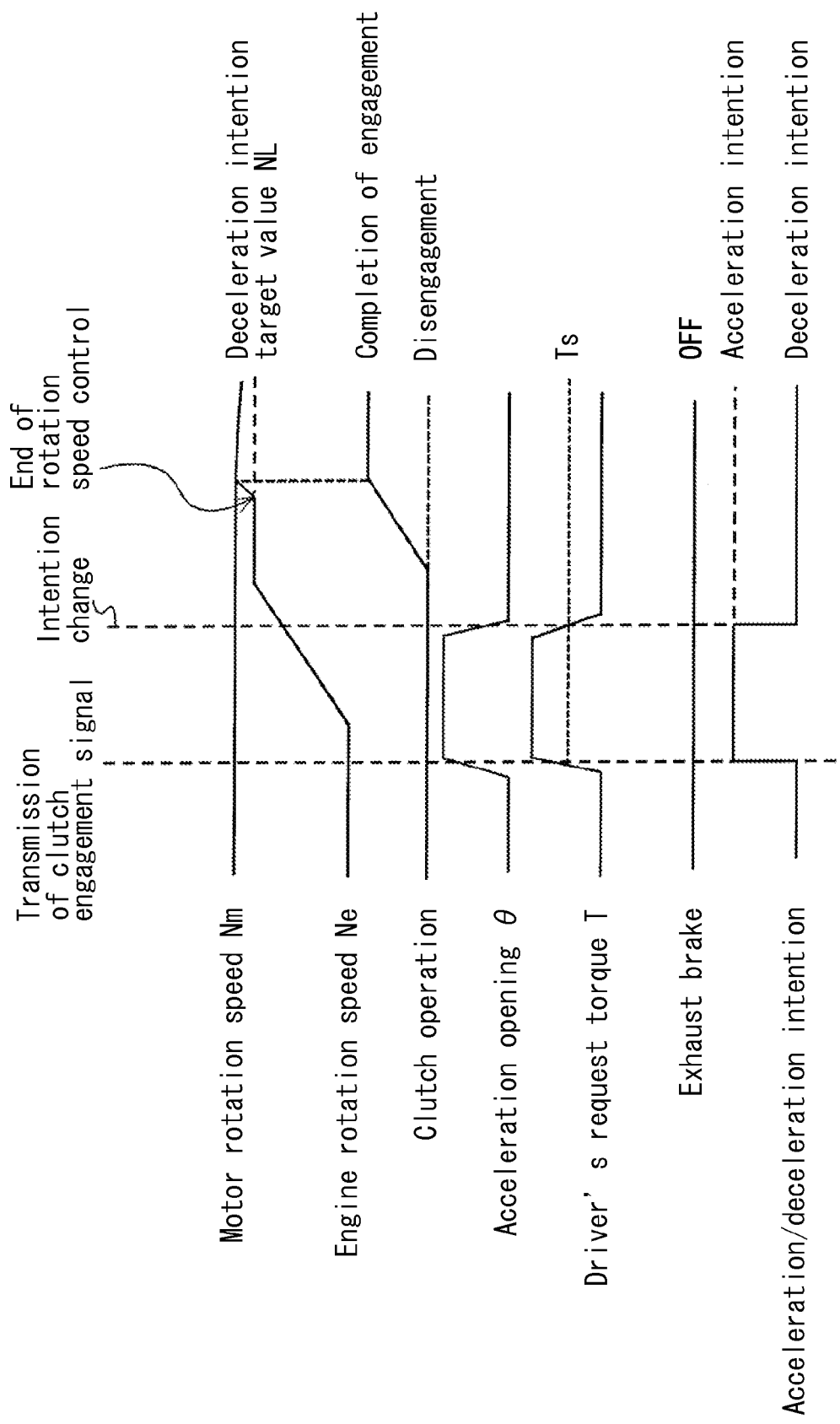
FIG. 4 is a time chart illustrating the control method by the drive control apparatus illustrated in FIG. 1 in a case where the vehicle is changed from the acceleration intention mode to the deceleration intention mode before a rotation speed of an engine illustrated in FIG. 1 reaches a deceleration intention target value.

As illustrated in FIG. 4, in a case where the operation of the acceleration pedal 14 is released in a state where the vehicle VE is once determined to be in the acceleration intention mode because of the operation of the acceleration pedal 14 and thus the rotation speed Ne of the engine 2 is increasing to the acceleration intention target value NH, the request torque T relative to the engine 2 decreases to be lower than the intention determination threshold value Ts. Thus, it is detected that the acceleration and deceleration intention of the vehicle VE is changed from the acceleration intention mode to the deceleration intention mode (i.e., an intention change).

In a case where the rotation speed Ne of the engine 2 is smaller than the deceleration intention target value NL serving as a follow-up determination threshold value at a time when the acceleration and deceleration intention of the vehicle VE is changed from the acceleration intention mode to the deceleration intention mode, the target value of the rotation speed Ne of the engine 2 is changed from the acceleration intention target value NH to the deceleration intention target value NL. Afterwards, in the same way as illustrated in FIG. 3, the rotation speed Ne of the engine 2 is controlled to increase to the deceleration intention target value NL and the engagement operation of the clutch device 5 is performed.

Figure 5:
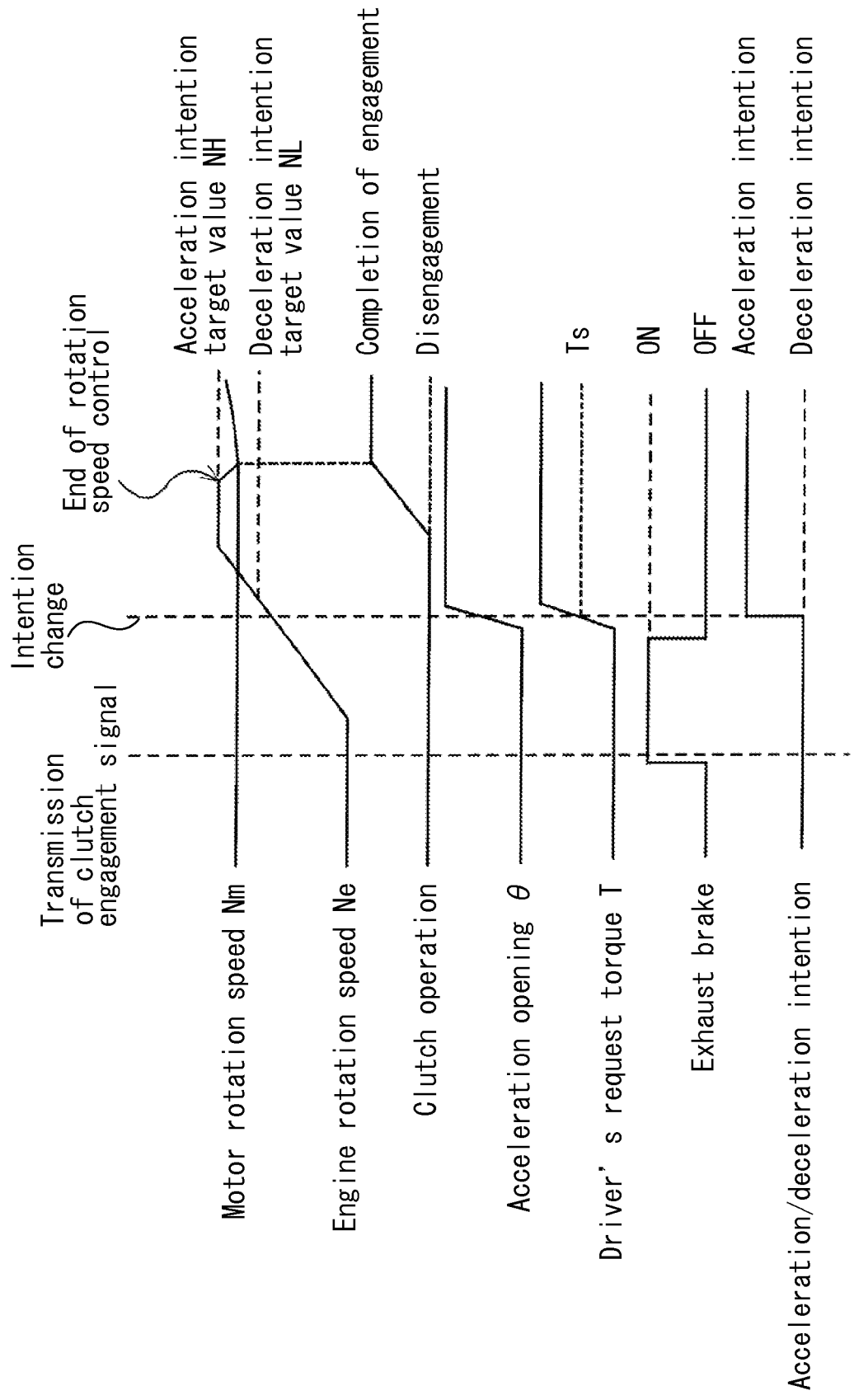
FIG. 5 is a time chart illustrating the control method by the drive control apparatus illustrated in FIG. 1 in a case where the vehicle is changed from the deceleration intention mode to the acceleration intention mode before the rotation speed of the engine reaches the deceleration intention target value.

As illustrated in FIG. 5, in a case where the operation of the exhaust brake switch 13 is released and the acceleration pedal 14 is operated in a state where the vehicle VE is once determined to be in the deceleration intention mode because of the operation of the exhaust brake switch 13 and thus the rotation speed Ne of the engine 2 is increasing to the deceleration intention target value NL, the request torque T relative to the engine 2 increases to be greater than the intention determination threshold value Ts. Thus, it is detected that the acceleration and deceleration intention of the vehicle VE is changed from the deceleration intention mode to the acceleration intention mode (i.e., the intention change).

In a case where the rotation speed Ne of the engine 2 is smaller than the deceleration intention target value NL serving as the follow-up determination threshold value at a time when the acceleration and deceleration intention of the vehicle VE is changed from the deceleration intention mode to the acceleration intention mode, the target value of the rotation speed Ne of the engine 2 is changed from the deceleration intention target value NL to the acceleration intention target value NH. Afterwards, in the same way as illustrated in FIG. 2, the rotation speed Ne of the engine 2 is controlled to increase to the acceleration intention target value NH and the engagement operation of the clutch device 5 is performed.

Figure 6:
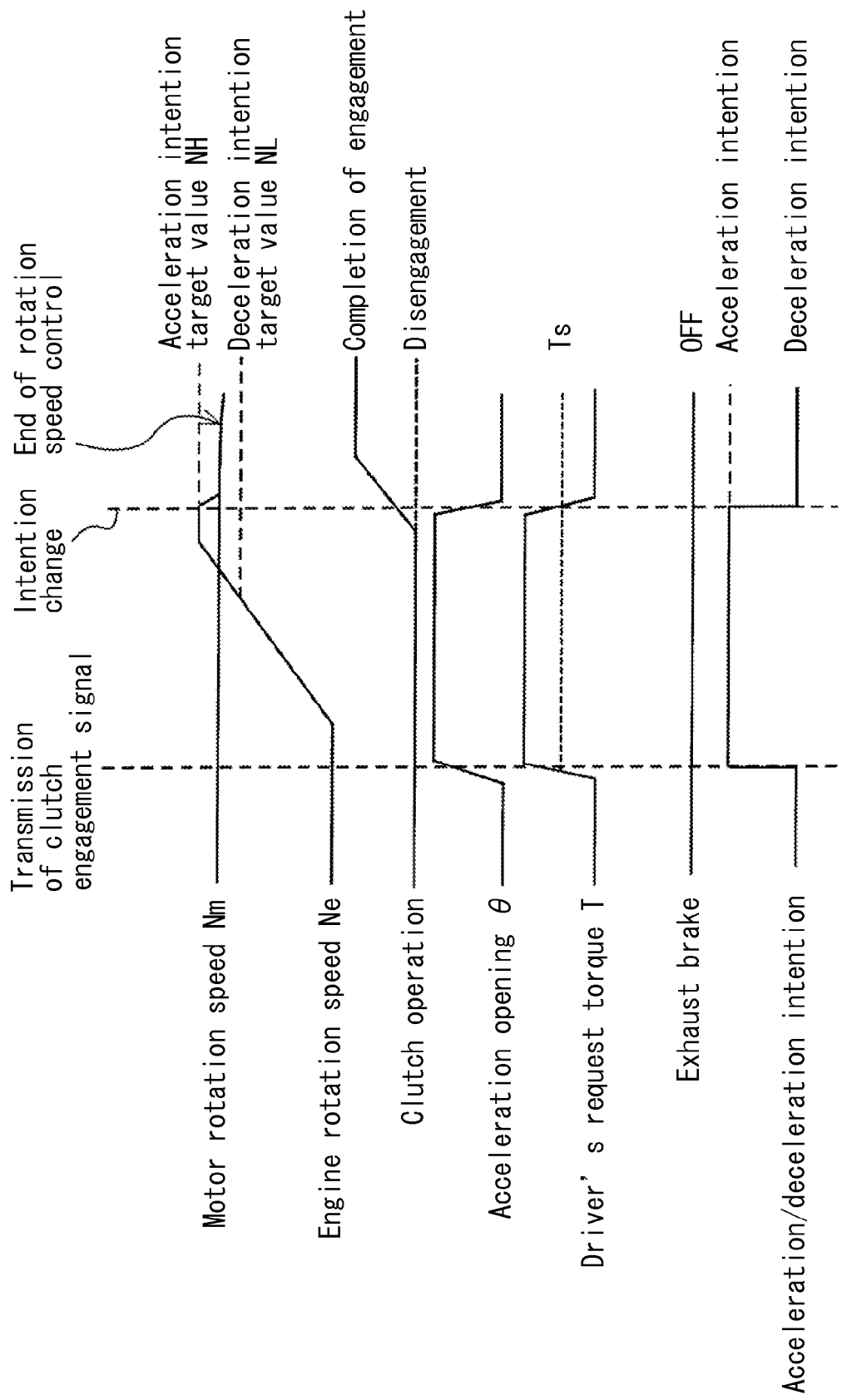
FIG. 6 is a time chart illustrating the control method by the drive control apparatus illustrated in FIG. 1 in a case where the vehicle is changed from the acceleration intention mode to the deceleration intention mode after the rotation speed of the engine reaches the deceleration intention target value.

Next, in FIG. 6, the vehicle VE is once determined to be in the acceleration intention mode because of the operation of the acceleration pedal 14 and thereafter the operation of the acceleration pedal 14 is released. Thus, the acceleration and deceleration intention of the vehicle VE is changed from the acceleration intention mode to the deceleration intention mode. As illustrated in FIG. 6, in a case where the rotation speed Ne of the engine 2 is equal to or greater than the deceleration intention target value NL serving as the follow-up determination threshold value at the time when the acceleration and deceleration intention of the vehicle VE is changed from the acceleration intention mode to the deceleration intention mode, the target value of the rotation speed Ne of the engine 2 is changed from the acceleration intention target value NH to a value equal to the rotation speed Nm of the electric motor 6 at that time. Afterwards, the rotation speed Ne of the engine 2 is controlled to decrease to the value equal to the rotation speed Nm of the electric motor 6 and the engagement operation of the clutch device 5 is continuously performed.

As mentioned above, in a case where the acceleration and deceleration intention of the vehicle VE is changed from the acceleration intention mode to the deceleration intention mode in a state where the rotation speed Ne of the engine 2 is equal to or greater than the deceleration intention target value NL (i.e., the rotation speed Ne of the engine 2 is close to the rotation speed Nm of the electric motor 6 at that time), the driver of the vehicle VE may desire a large deceleration. Thus, it is required to immediately bring the clutch device 5 into the engagement state to increase the deceleration. At this time, when the deceleration intention target value NL is newly specified as the target value of the rotation speed Ne, a relatively long time period is required for the clutch device 5 to be brought into the engagement state, which may cause the driver to have an uncomfortable feeling. Therefore, in order to achieve the immediate engagement state of the clutch device 5 without giving the driver the uncomfortable feeling, the value equal to the rotation speed Nm of the electric motor 6 at that time is specified as the target value of the rotation speed Ne of the engine 2.

Figure 7:
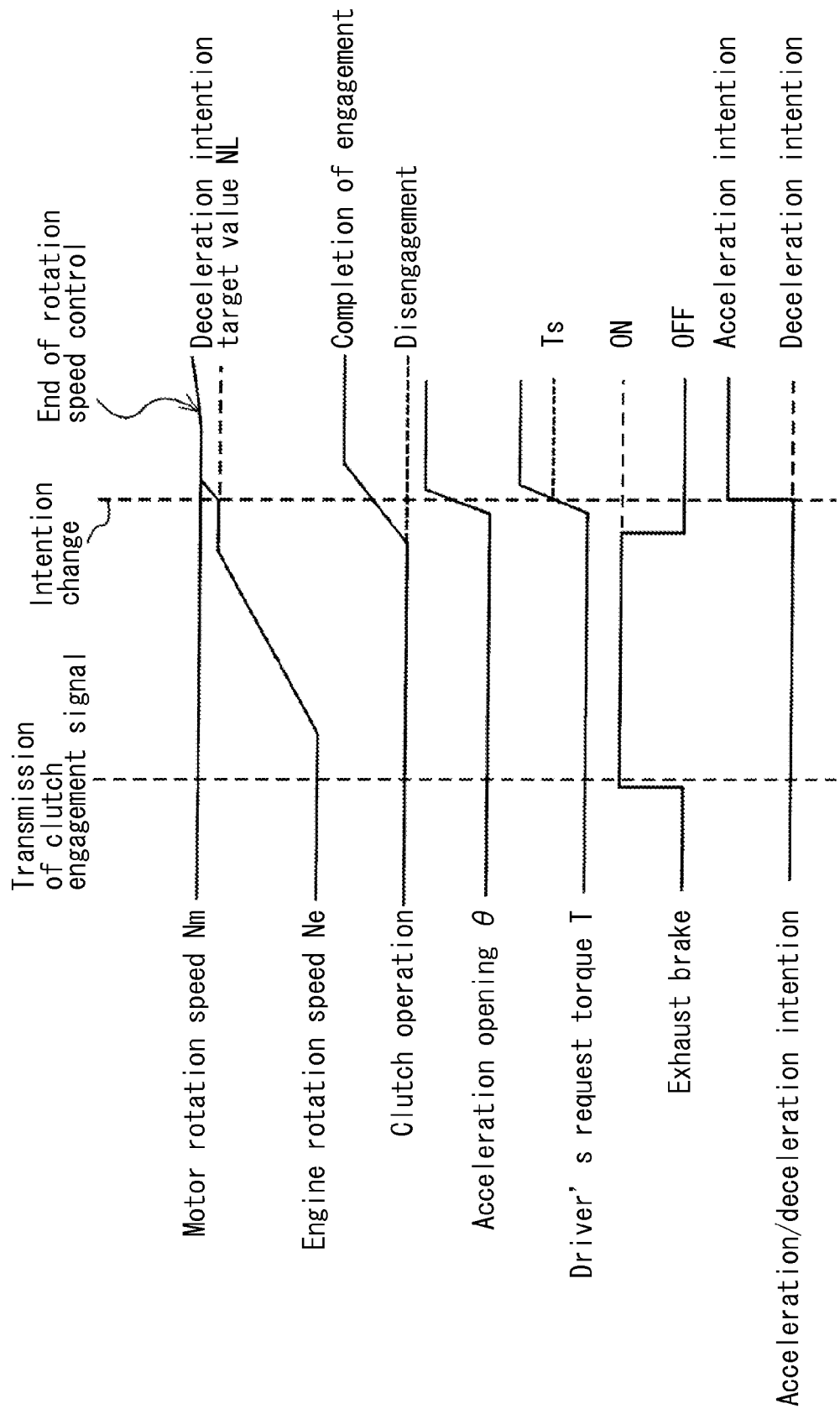
FIG. 7 is a time chart illustrating the control method by the drive control apparatus illustrated in FIG. 1 in a state where the vehicle is changed from the deceleration intention mode to the acceleration intention mode after the rotation speed of the engine reaches the deceleration intention target value.

In FIG. 7, the vehicle VE is once determined to be in the deceleration intention mode because of the operation of the exhaust brake switch 13 and thereafter the operation of the exhaust brake switch 13 is released and the acceleration pedal 14 is operated. Thus, the acceleration and deceleration intention of the vehicle VE is changed from the deceleration intention mode to the acceleration intention mode. Then, as illustrated in FIG. 7, in a case where the rotation speed Ne of the engine 2 is equal to or greater than the deceleration intention target value NL serving as the follow-up determination threshold value at the time when the acceleration and deceleration intention of the vehicle VE is changed from the deceleration intention mode to the acceleration intention mode, the target value of the rotation speed Ne of the engine 2 is changed from the deceleration intention target value NL to a value equal to the rotation speed Nm of the electric motor 6 at that time. Afterwards, the rotation speed Ne of the engine 2 is controlled to increase to the value equal to the rotation speed Nm of the electric motor 6 and the engagement operation of the clutch device 5 is continuously performed.

As mentioned above, in a case where the acceleration and deceleration intention of the vehicle VE is changed from the deceleration intention mode to the acceleration intention mode in a state where the rotation speed Ne of the engine 2 is equal to or greater than the deceleration intention target value NL (i.e., the rotation speed Ne of the engine 2 is close to the rotation speed Nm of the electric motor 6 at that time), the driver of the vehicle VE may desire a large output torque. Thus, it is required to immediately bring the clutch device 5 into the engagement state to increase the output torque. At this time, when the acceleration intention target value NH is newly specified as the target value of the rotation speed Ne, a relatively long time period is required for the clutch device 5 to be brought into the engagement state, which may cause the driver to have an uncomfortable feeling. Therefore, in order to achieve the immediate engagement state of the clutch device 5 without giving the driver the uncomfortable feeling, the value equal to the rotation speed Nm of the electric motor 6 at that time is specified as the target value of the rotation speed Ne of the engine 2.

Figure 8:
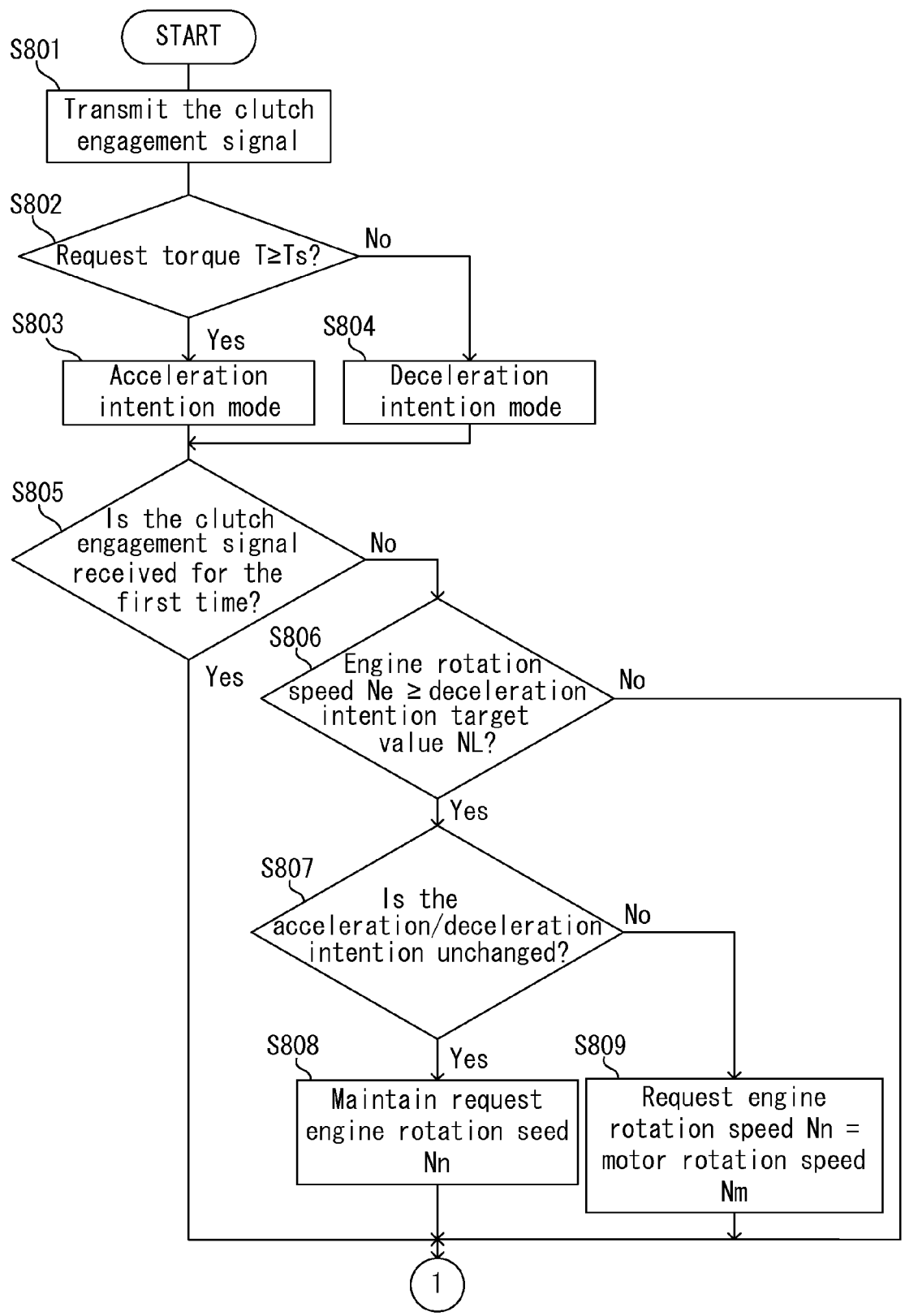
FIG. 8 is a first half of a flowchart of a control flow performed by a hybrid ECU illustrated in FIG. 1.
Figure 9:
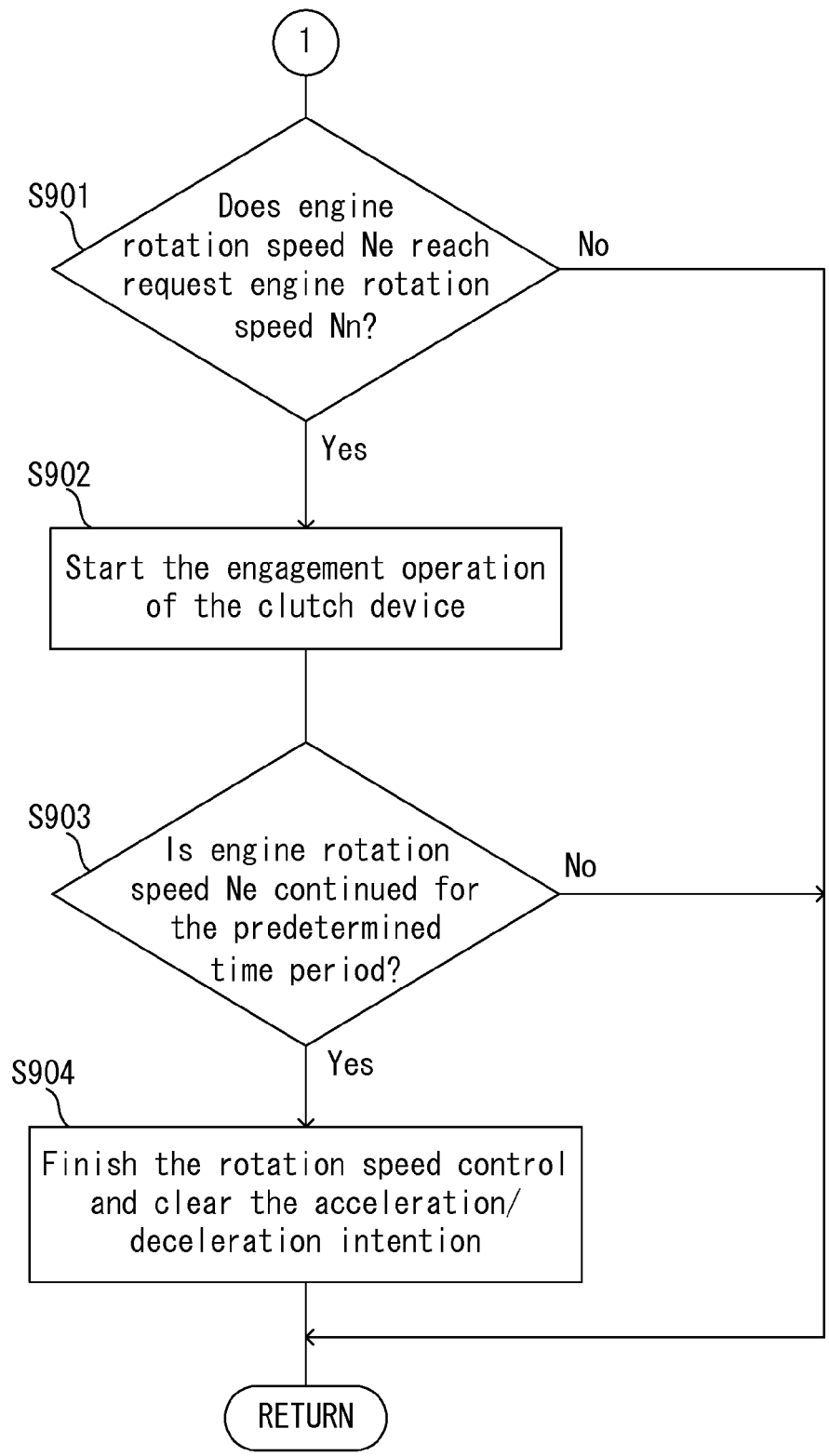
FIG. 9 is a second half of the flowchart of the control flow performed by the hybrid ECU.

A control flow performed by the hybrid ECU 11 will be explained with reference to flowcharts illustrated in FIGS. 8 and 9. In a case where the clutch engagement signal is transmitted by the hybrid ECU 11 in step 801 (i.e., S801, hereinafter "step" will be abbreviated to "S"), it is determined whether or not the request torque T relative to the engine 2 by the driver calculated on a basis of the acceleration opening θ and the rotation speed Ne of the engine 2 is equal to or greater than the intention determination threshold value Ts in S802. When it is determined that the request torque T is equal to or greater than the intention determination threshold value Ts, it is detected that the vehicle VE is in the acceleration intention mode in S803. When it is determined that the request torque T is smaller than the intention determination threshold value Ts, it is detected that the vehicle VE is in the deceleration intention mode in S804. In a case where it is detected that the vehicle VE is in the acceleration intention mode in S803, the rotation speed Ne of the engine 2 increases to the acceleration intention target value NH serving as the target value. On the other hand, in a case where it is detected that the vehicle VE is in the deceleration intention mode in S804, the rotation speed Ne of the engine 2 increases to the deceleration intention target value NL serving as the target value.

After the start of increasing the rotation speed Ne of the engine 2, it is determined whether or not the clutch engagement signal by the clutch ECU 12 is received for the first time, i.e., the present clutch engagement signal is the first reception in S805. When it is determined that the present clutch engagement signal is the first reception, the flow proceeds to S901 in FIG. 9 so as to determine whether or not the rotation speed Ne of the engine 2 reaches a request engine rotation speed Nn (i.e., the acceleration intention target value NH or the deceleration intention target value NL). When it is determined that the rotation speed Ne of the engine 2 reaches the request engine rotation speed Nn, the engagement operation of the clutch device 5 is started in S902. On the other hand, when it is determined that the rotation speed Ne of the engine 2 does not reach the request engine rotation speed Nn, the flow returns to the start of the flow chart in FIG. 8.

In S903, it is determined whether or not a state where the rotation speed Ne of the engine 2 is equal to the request engine rotation speed Nn continues for the predetermined time period. When it is determined that such state continues for the predetermined time period, the rotation speed control of the engine 2 is terminated and the determination of the acceleration and deceleration intention is cleared in S904. When it is determined that such state does not continue for the predetermined time period, the flow proceeds to the start of the flow chart in FIG. 8.

On the other hand, when it is determined that the reception of the present clutch engagement signal is not the first reception in S805, then it is determined whether or not the rotation speed Ne of the engine 2 is equal to or greater than the deceleration intention target value NL serving as the follow-up determination threshold value in S806. When it is determined that the rotation speed Ne of the engine 2 is equal to or greater than the deceleration intention target value NL, it is then determined whether or not the acceleration and deceleration intention of the vehicle VE is changed (the intention change) in S807.

When it is determined that the acceleration and deceleration intention of the vehicle VE is not changed, the present request engine rotation speed Nn is maintained in S808. When it is determined that the acceleration and deceleration intention of the vehicle VE is changed (i.e., the intention change is present), the value equal to the present rotation speed Nm of the electric motor 6 is specified as the request engine rotation speed Nn (the target value of the rotation speed Ne of the engine 2) in S809.

After the present request engine rotation speed Nn is maintained in S808, after the request engine rotation speed Nn is specified to be equal to the rotation speed Nm of the electric motor 6 in S809, or after the rotation speed Ne of the engine 2 is determined to be smaller than the deceleration intention target value NL in step 806, the operation proceeds to S901.

According to the present embodiment, in a case where it is detected that the vehicle VE is in the acceleration intention mode when the clutch device 5 is operated from the disengagement state to the engagement state, the rotation speed Ne of the engine 2 is controlled to be equal to the acceleration intention target value NH that is greater than the rotation speed of the electric motor 6 and thereafter the clutch device 5 is brought into the engagement state. In a case where it is detected that the vehicle VE is in the deceleration intention mode, the rotation speed Ne is controlled to be equal to the deceleration intention target value NL that is smaller than the rotation speed of the electric motor 6 and thereafter the clutch device 5 is brought into the engagement state. As a result, the behavior of the vehicle VE that occurs due to the engagement of the clutch device 5 and the intention of the driver of the vehicle VE at that time may match each other, thereby inhibiting the unintended impact from occurring at the vehicle VE and the driver from having the uncomfortable feeling.

Specifically, in a case where it is detected that the vehicle VE is in the acceleration intention mode when the clutch device 5 is operated from the disengagement state to the engagement state, the rotation speed Ne of the engine 2 is controlled to be greater than the rotation speed Nm of the electric motor 6 and thereafter the clutch device 5 is brought into the engagement state. As a result, the driver may feel like the vehicle is pushed forward. In addition, in a case where it is detected that the vehicle VE is in the deceleration intention mode when the clutch device 5 is operated from the engagement state to the disengagement state, the rotation speed Ne of the engine 2 is controlled to be smaller than the rotation speed Nm of the electric motor 6 and thereafter the clutch device 5 is brought into the engagement state. As a result, the driver may feel like the vehicle is pulled rearward.

In addition, in a case where the vehicle VE is changed from the acceleration intention mode to the deceleration intention mode or from the deceleration intention mode to the acceleration intention mode in a state where the rotation speed Ne of the engine 2 is equal to or greater than the deceleration intention target value NL serving as the follow-up determination threshold value while the rotation speed Ne of the engine 2 is increasing to the acceleration intention target value NH or the deceleration intention target value NL, the target value of the rotation speed Ne of the engine 2 is controlled to be equal to the rotation speed Nm of the electric motor 6. As a result, even when the acceleration and deceleration intention of the vehicle VE is changed after the rotation speed Ne of the engine 2 is close to the rotation seed Nm of the electric motor 6, the clutch device 5 is promptly brought into the engagement state and the driver of the vehicle VE is inhibited from having the uncomfortable feeling without the drastic change of the target value of the rotation speed Ne of the engine 2 from the acceleration intention target value NH to the deceleration intention target value NL or from the deceleration intention target value NL to the acceleration intention target value NH.

Further, because the hybrid ECU 11 uses the deceleration intention target value NL as the follow-up determination threshold value, the follow-up determination threshold value is inhibited from being specifically defined. Thus, an amount of used memory of the hybrid ECU 11 decreases and further a calculation for controlling the rotation speed Ne of the engine 2 decreases. As the acceleration and deceleration intention detecting portion, it is detected whether the vehicle VE is in the acceleration intention mode or the deceleration intention mode based on the request torque T relative to the engine 2 calculated on a basis of the acceleration opening θ of the vehicle VE and the rotation speed Ne of the engine 2. Thus, a specific structure may not be required at the vehicle VE for detecting the acceleration and deceleration intention of the vehicle VE, which leads to the drive control apparatus 1 easily manufactured at a low cost.

The present embodiment is not limited to have the aforementioned configuration and may be modified as follows. Only the acceleration opening θ may be used or an operation amount of a brake pedal of the vehicle VE may be used as the acceleration and deceleration intention detecting portion. In addition, an operation speed of the acceleration pedal 14 or the brake pedal, for example, may be used as the acceleration and deceleration intention detecting portion. Further, an operation of the exhaust brake switch 13 may be used as the acceleration and deceleration intention detecting portion. Instead of the deceleration intention target value NL, a specific threshold value within a predetermined range from the rotation speed Nm of the electric motor 6 may be defined as the follow-up determination threshold value used in a case where the acceleration and deceleration intention of the vehicle VE is changed.

In FIGS. 4 and 5, when the acceleration and deceleration intention of the vehicle VE is changed in a state where the rotation speed Ne of the engine 2 is equal to or smaller than the deceleration intention target value NL, the target value of the rotation speed Ne of the engine 2 may be changed from the acceleration intention target value NH to the deceleration intention target value NL or from the deceleration intention target value NL to the acceleration intention target value NH. In addition, in FIGS. 6 and 7, when the acceleration and deceleration intention of the vehicle VE is changed in a state where the rotation speed Ne of the engine 2 is greater than the deceleration intention target value NL, the target value of the rotation speed Ne of the engine 2 is changed to be a value equal to the rotation speed Nm of the electric motor 6.

According to the aforementioned embodiment, the clutch ECU 12 controls the clutch device 5 to be operated from the disengagement state to the engagement state in a case where the acceleration pedal 14 is depressed during the driving state of the vehicle VE, and in a case where the exhaust brake device 3 is operated during the driving state of the vehicle VE. Alternatively, the clutch ECU 12 may control the clutch device 5 to be operated from the disengagement state to the engagement state in a case where the vehicle battery 9 is fully charged during a regenerative brake operation and the engine brake is activated.

Further alternatively, the clutch device 5 may be operated from the disengagement state to the engagement state in a case where a lock up state of the transmission 16 is released during the driving state of the vehicle VE, for example.

A synchronous motor, an induction motor, a continuous current motor, and any other various rotary apparatuses may be applicable to the electric motor 6 according to the embodiment.

According to the aforementioned embodiment, in a case of operating the clutch device 5 from the disengagement state to the engagement state, the hybrid ECU 11 changes the target value of the rotation speed Ne of the engine 2 to the deceleration intention target value NL in a case where the vehicle VE is changed from the acceleration intention mode to the deceleration intention mode in a state where the rotation speed Ne of the engine 2 is equal to or smaller than the follow-up determination threshold value smaller by the predetermined value than the value of the rotation speed Nm of the electric motor 6 while the rotation speed Ne of the engine 2 is increasing to the acceleration intention target value NH. In the case of operating the clutch device 5 from the disengagement state to the engagement state, the hybrid ECU 11 changes the target value of the rotation speed Ne of the engine 2 to the acceleration intention target value NH in a case where the vehicle VE is changed from the deceleration intention mode to the acceleration intention mode in a state where the rotation speed Ne of the engine 2 is equal to or smaller than the follow-up determination threshold value while the rotation speed Ne of the engine 2 is increasing to the deceleration intention target value NL. In the case of operating the clutch device 5 from the disengagement state to the engagement state, the hybrid ECU 11 changes the target value of the rotation speed Ne of the engine 2 to the value of the rotation speed Nm of the electric motor 6 in a case where the vehicle VE is changed from the acceleration intention mode to the deceleration intention mode or from the deceleration intention mode to the acceleration intention mode in a state where the rotation speed Ne of the engine 2 is equal to or greater than the follow-up determination threshold value while the rotation speed Ne of the engine 2 is increasing to the acceleration intention target value NH or the deceleration intention target value NL.

In addition, according to the aforementioned embodiment, the hybrid ECU 11 uses the deceleration intention target value NL as the follow-up determination threshold value.

Further, according to the aforementioned embodiment, the acceleration and deceleration intention detecting portion (the acceleration opening sensor 15 and the engine rotation sensor 4) detects whether the vehicle VE is in the acceleration intention mode or the deceleration intention mode based on the request torque T relative to the engine 2 calculated on a basis of the acceleration opening θ of the vehicle 2 and the rotation speed Ne of the engine 2.

Furthermore, according to the aforementioned embodiment, the acceleration and deceleration intention detecting portion (the operation of the exhaust brake switch 13 or the operation amount of the brake pedal of the vehicle VE) detects whether the vehicle VE is in the acceleration intention mode or the deceleration intention mode based on the operation of the exhaust brake switch 13 or the brake pedal of the vehicle VE.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A drive control apparatus for a vehicle, comprising:
an engine driving wheels;

an electric motor arranged between the engine and the wheels in series;

a clutch mechanism arranged between the engine and the electric motor and brought into an engagement state to connect the engine and the electric motor to each other and into a disengagement state to disconnect the engine and the electric motor from each other;

an engine rotation sensor detecting a rotation speed of the engine;

a motor rotation sensor detecting a rotation speed of the electric motor;

an acceleration and deceleration intention detecting portion detecting whether the vehicle is in an acceleration intention mode or a deceleration intention mode; and a controller controlling an operation of the clutch mechanism so that the vehicle is driven by one of or both of the engine and the electric motor based on a detection value of each of the engine rotation sensor, the motor rotation sensor, and the acceleration and deceleration intention detecting portion, wherein in a case of operating the clutch mechanism from the disengagement state to the engagement state, the controller controls the rotation speed of the engine to be an acceleration intention target value greater than the rotation speed of the motor and thereafter brings the clutch mechanism into the engagement state in a case where the acceleration and deceleration intention detecting portion detects that the vehicle is in the acceleration intention mode, and controls the rotation speed of the engine to be a deceleration intention target value smaller than the rotation speed of the motor and thereafter brings the clutch mechanism into the engagement state in a case where the acceleration and deceleration intention detecting portion detects that the vehicle is in the deceleration intention mode.

2. The drive control apparatus according to claim 1, wherein in the case of operating the clutch mechanism from the disengagement state to the engagement state, the controller changes a target value of the rotation speed of the engine to the deceleration intention target value in a case where the vehicle is changed from the acceleration intention mode to the deceleration intention mode in a state where the rotation speed of the engine is equal to or smaller than a follow-up determination threshold value smaller by a predetermined value than a value of the rotation speed of the electric motor while the rotation speed of the engine is increasing to the acceleration intention target value, wherein in the case of operating the clutch mechanism from the disengagement state to the engagement state, the controller changes the target value of the rotation speed of the engine to the acceleration intention target value in a case where the vehicle is changed from the deceleration intention mode to the acceleration intention mode in a state where the rotation speed of the engine is equal to or smaller than the follow-up determination threshold value while the rotation speed of the engine is increasing to the deceleration intention target value, and wherein in the case of operating the clutch mechanism from the disengagement state to the engagement state, the controller changes the target value of the rotation speed of the engine to the value of the rotation speed of the electric motor in a case where the vehicle is changed from the acceleration intention mode to the deceleration intention mode or from the deceleration intention mode to the acceleration intention mode in a state where the rotation speed of the engine is equal to or greater than the follow-up determination threshold value while the rotation speed of the engine is increasing to the acceleration intention target value or the deceleration intention target value.

3. The drive control apparatus according to claim 1, wherein the controller uses the deceleration intention target value as the follow-up determination threshold value.

4. The drive control apparatus according to claim 1, wherein the acceleration and deceleration intention detecting portion detects whether the vehicle is in the acceleration intention mode or the deceleration intention mode based on a request torque relative to the engine calculated on a basis of an acceleration opening of the vehicle and the rotation speed of the engine.

5. The drive control apparatus according to claim 1, wherein the acceleration and deceleration intention detecting portion detects whether the vehicle is in the acceleration intention mode or the deceleration intention mode based on an operation of an exhaust brake switch or a brake pedal of the vehicle.

6. A method of controlling a drive apparatus for a vehicle, the drive apparatus including an engine driving wheels, an electric motor arranged between the engine and the wheels in series, a clutch mechanism arranged between the engine and the electric motor and brought into an engagement state to connect the engine and the electric motor to each other and into a disengagement state to disconnect the engine and the electric motor from each other, an engine rotation sensor detecting a rotation speed of the engine, and a motor rotation sensor detecting a rotation speed of the electric motor, the method comprising:

controlling the rotation speed of the engine to be an acceleration intention target value greater than the rotation speed of the motor and thereafter bringing the clutch mechanism into the engagement state when the vehicle is in the acceleration intention mode in a case of operating the clutch mechanism from the disengagement state to the engagement state; and controlling the rotation speed of the engine to be a deceleration intention target value smaller than the rotation speed of the motor and thereafter bringing the clutch mechanism into the engagement state when the vehicle is in the deceleration intention mode in the case of operating the clutch mechanism from the disengagement state to the engagement state.

\* \* \* \* \*